US012639667B2

(12) United States Patent
Bellows et al.

(10) Patent No.: US 12,639,667 B2
(45) Date of Patent: May 26, 2026

(54) SYSTEMS, APPARATUSES, AND METHODS FOR TRIGGERING OBJECT RECOGNITION AND PLANOGRAM GENERATION VIA SHELF SENSORS

(71) Applicant: ZEBRA TECHNOLOGIES CORPORATION, Lincolnshire, IL (US)

(72) Inventors: David Bellows, Old Westbury, NY (US); Thomas E. Wulff, Brookhaven, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/737,717

(22) Filed: Jan. 8, 2020

(65) Prior Publication Data

US 2021/0209550 A1 Jul. 8, 2021

(51) Int. Cl.
*G06Q 10/0875* (2023.01)
*G06V 20/20* (2022.01)

(52) U.S. Cl.
CPC ......... *G06Q 10/0875* (2013.01); *G06V 20/20* (2022.01)

(58) Field of Classification Search
CPC ....................... G06Q 10/0875; G06K 9/00671
See application file for complete search history.

(56) References Cited

U.S. PATENT DOCUMENTS

2004/0034581 A1 2/2004 Hill et al.
2004/0099741 A1* 5/2004 Dorai ................... G06K 7/1439
235/462.08

2009/0059270 A1 3/2009 Opalach et al.
2009/0295592 A1* 12/2009 Mizukawa .............. G06F 3/147
340/691.5
2010/0287057 A1* 11/2010 Aihara ................... G06Q 30/00
705/16
2011/0241843 A1* 10/2011 Marsanne ............. G06F 3/1454
340/10.3
2012/0133623 A1* 5/2012 Byun ....................... G09G 3/20
345/207
2012/0169585 A1* 7/2012 Kim ........................ G08B 5/36
345/156
2013/0313317 A1 11/2013 Waters
(Continued)

OTHER PUBLICATIONS

International Search Report and Written Opinion for International Application No. PCT/US2021/12274 mailed on Mar. 26, 2021.

*Primary Examiner* — Florian M Zeender
*Assistant Examiner* — Kimberly S. Bursum

(57) ABSTRACT

Systems and methods for triggering object recognition and planogram generation via shelf sensors are disclosed herein. An example apparatus may comprise a shelf, at least one sensor affixed to the shelf, at least one camera affixed to the shelf, and at least one server communicatively coupled to the at least one camera and the at least one sensor. The apparatus may be configured such that the at least one sensor is configured to detect that at least one threshold has been met, and the at least one sensor is further configured to trigger an image to be taken by the least one camera; wherein the at least one camera is configured to capture at least one image based on the met threshold, and the at least one server is configured to identify at least one product identifier based on the at least one captured image.

17 Claims, 5 Drawing Sheets

(56)　　　　　References Cited

U.S. PATENT DOCUMENTS

| | | | |
|---|---|---|---|
| 2014/0210692 A1* | 7/2014 | Waters | G06Q 30/06 |
| | | | 345/2.3 |
| 2014/0249916 A1* | 9/2014 | Verhaeghe | G06Q 30/0633 |
| | | | 705/14.51 |
| 2014/0358656 A1* | 12/2014 | Poole | G06Q 30/0215 |
| | | | 705/14.17 |
| 2015/0199942 A1* | 7/2015 | Mochizuki | G06F 3/1431 |
| | | | 345/531 |
| 2015/0348450 A1* | 12/2015 | Park | G06Q 30/0641 |
| | | | 340/5.91 |
| 2016/0048907 A1* | 2/2016 | Park | G06T 1/0007 |
| | | | 345/634 |
| 2016/0217417 A1 | 7/2016 | Ma et al. | |
| 2017/0293959 A1* | 10/2017 | Itou | G06K 9/00624 |
| 2018/0005035 A1* | 1/2018 | Bogolea | B25J 9/1697 |
| 2019/0034864 A1* | 1/2019 | Skaff | G06Q 10/087 |
| 2019/0073775 A1 | 3/2019 | Lam et al. | |
| 2019/0149725 A1* | 5/2019 | Adato | H04N 1/32144 |
| | | | 348/158 |
| 2019/0213212 A1* | 7/2019 | Adato | G06F 16/23 |
| 2019/0215424 A1* | 7/2019 | Adato | G07G 1/0036 |
| 2020/0111053 A1* | 4/2020 | Bogolea | G06K 9/00664 |
| 2020/0151692 A1* | 5/2020 | Gao | G07G 1/0063 |
| 2020/0232797 A1* | 7/2020 | Al Amour | G05D 1/101 |
| 2020/0335015 A1* | 10/2020 | Okuma | G09G 3/2096 |
| 2021/0065281 A1* | 3/2021 | Haulk | G06V 40/28 |
| 2021/0067744 A1* | 3/2021 | Buibas | G01S 17/08 |
| 2022/0116737 A1* | 4/2022 | White | G06F 16/9535 |

* cited by examiner

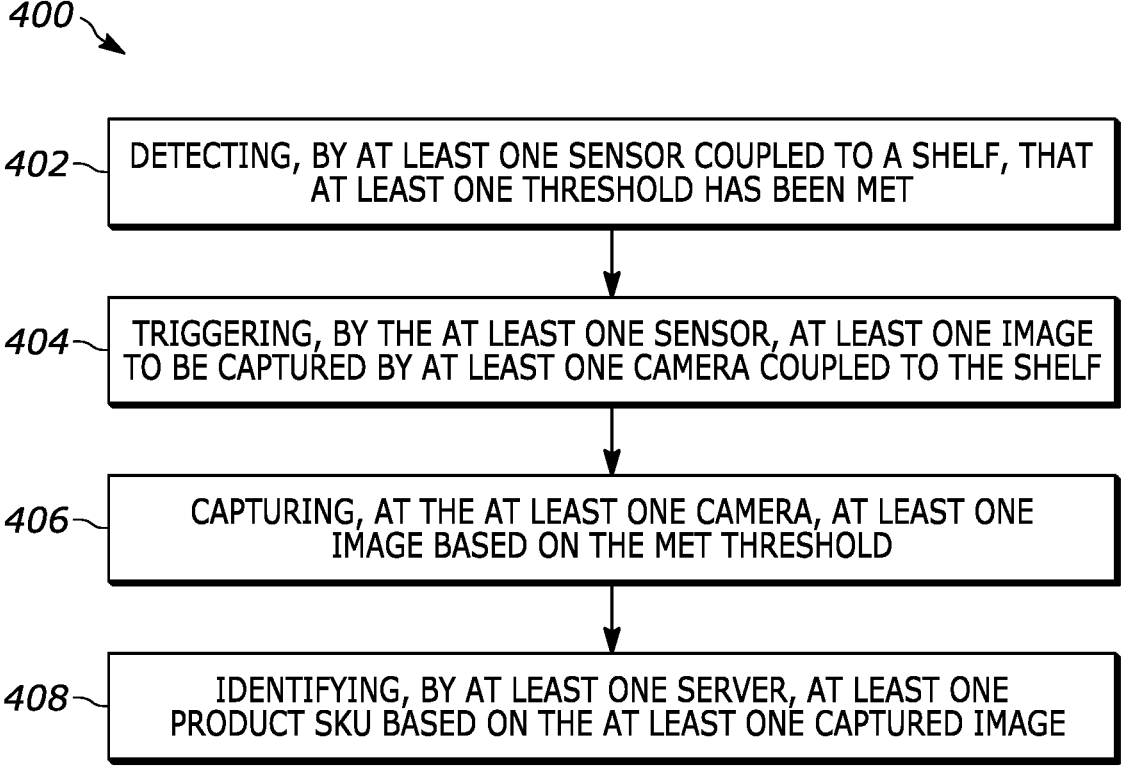

400

402 — DETECTING, BY AT LEAST ONE SENSOR COUPLED TO A SHELF, THAT AT LEAST ONE THRESHOLD HAS BEEN MET

404 — TRIGGERING, BY THE AT LEAST ONE SENSOR, AT LEAST ONE IMAGE TO BE CAPTURED BY AT LEAST ONE CAMERA COUPLED TO THE SHELF

406 — CAPTURING, AT THE AT LEAST ONE CAMERA, AT LEAST ONE IMAGE BASED ON THE MET THRESHOLD

408 — IDENTIFYING, BY AT LEAST ONE SERVER, AT LEAST ONE PRODUCT SKU BASED ON THE AT LEAST ONE CAPTURED IMAGE

FIG. 4

SYSTEMS, APPARATUSES, AND METHODS FOR TRIGGERING OBJECT RECOGNITION AND PLANOGRAM GENERATION VIA SHELF SENSORS

BACKGROUND

Retailers use a variety of shelf monitoring systems to track their inventory. Current shelf monitoring systems can either count products or identify products with good accuracy, but they do not perform both well. For example, smart shelves based on resistive, capacitive, or light sensors can know how many objects are on a shelf and where the items are positioned, but they do not have the ability to confidently state what specifically those items are.

Conversely, shelf monitoring robots and fixed cross-aisle cameras periodically capture images of a retailer's shelves and use image recognition tools to identify what the stocked items are, but this only acquires product facings. They therefore cannot accurately tell how many items, if any, are actually on the shelf behind those first items. One of the counting systems from above could be deployed along with an object recognition system in an attempt to provide a complete arrangement, but this presents a number of system integration and cost issues.

SUMMARY

In an embodiment, the present invention is an apparatus for triggering object recognition and planogram generation. The apparatus may comprise a shelf, at least one sensor affixed to the shelf, at least one camera affixed to the shelf, and at least one server communicatively coupled to the at least one camera and the at least one sensor. The apparatus may be configured such that the at least one sensor is configured to detect that at least one threshold has been met, and the at least one sensor is further configured to trigger an image to be taken by the least one camera; wherein the at least one camera is configured to capture at least one image based on the met threshold, and the at least one server is configured to identify at least one product identifier based on the at least one captured image.

In another embodiment, the present invention is a method for triggering object recognition and planogram generation. The method may comprise detecting, by at least one sensor coupled to a shelf, that at least one threshold has been met; triggering, by the at least one sensor, at least one image to be captured by at least one camera coupled to the shelf; capturing, at the at least one camera, at least one image based on the met threshold; and identifying, by at least one server, at least one product identifier based on the at least one captured image.

In yet another embodiment, the present invention is a tangible machine-readable medium comprising instructions for triggering object recognition and planogram generation. The instructions when executed, cause a machine to at least detect that at least one threshold has been met by at least one sensor; trigger at least one image to be captured by at least one camera coupled to the at least one sensor; capture at least one image based on the met threshold at the at least one camera; and identify at least one product identifier based on the at least one captured image by at least one server.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 illustrates an example flow diagram for object recognition and planogram generation.

Figure 1:
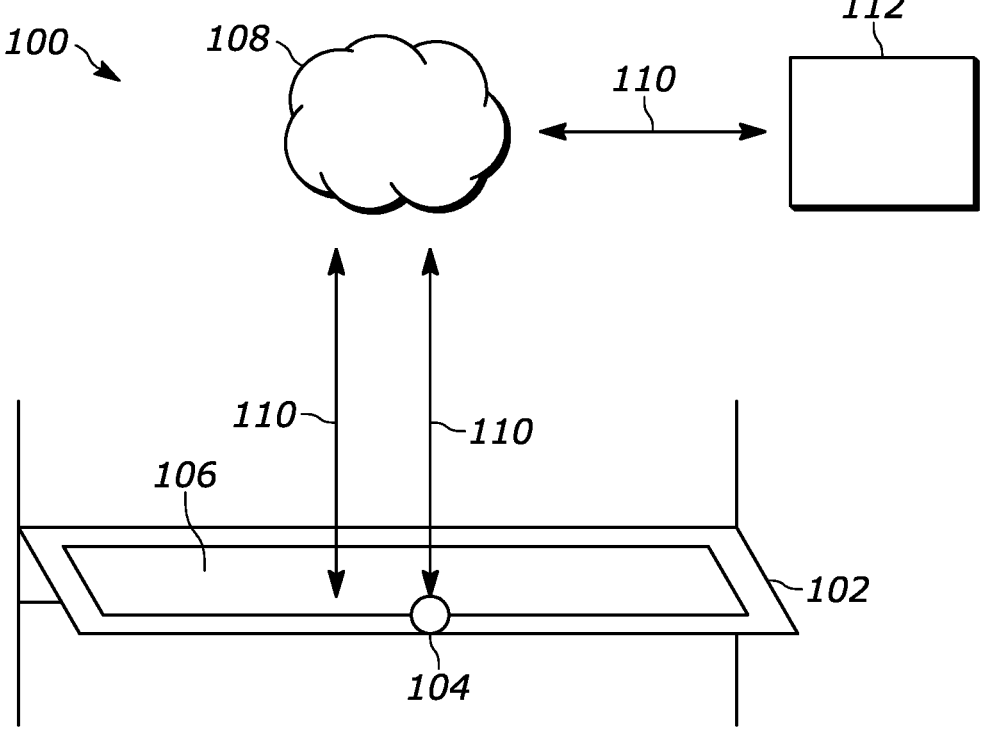
FIG. 1 illustrates an example system for object recognition and planogram generation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Systems, apparatuses, and methods for object recognition and planogram generation are disclosed herein. In particular, systems, apparatuses, and methods for triggering object recognition and planogram generation via shelf sensors are disclosed herein. Accordingly, the systems and methods disclosed herein are a better overall approach for retailers to take in tracking their inventory. The systems, apparatuses, and methods described herein may lead to cost savings and higher quality inventory management and planograms based on the more accurate object recognition and planogram generation.

In one embodiment an apparatus, or system, may comprise a camera and a smart shelf where the camera is integrated into the front edge of the smart shelf and looks back at the items sitting on the shelf, resulting in a singular piece of hardware that could both count the items on the shelf and recognize those items on the shelf. This way, the retailer, for example, does not have to purchase and deploy both a robot and smart shelves or be concerned about situations where there is no physical place to mount a cross-aisle camera to use in conjunction with smart shelves. In other embodiments the camera and smart shelf may not be physically integrated into a singular piece of hardware, but instead are logically integrated via network communication links.

One self-contained piece of hardware may simplify the system design, cost structure, deployment, and maintenance. The challenge with this approach however is attempting to acquire consistently good images for object recognition when the merchandise could be placed at a variety of distances from the camera. Achieving a suitable focus at both an especially close range as well as several inches away is a problem.

For example, in one embodiment, rather than taking a photo at an arbitrary time and then deciding if the image is useful (i.e. is there an object present, is it in focus, and is it at an appropriate distance?), the output of the smart shelf sensors can be used to determine if an object is appropriately positioned for a photo before exercising the camera. The camera would be focused only on the front inventory position near the shelf's edge, thereby simplifying the camera requirements and the object recognition processing as well as setting up clear bounds for a useful image. When the front position is empty, the system can continue to refer to the most recent image taken, and then once the position is occupied, the camera can be allowed to take another image. Since a successful implementation will require limiting power and communications, it is important that neither energy nor time are wasted on capturing and analyzing images that ultimately serve no purpose. This embodiment therefore serves as a valuable filter.

In a more specific example, the smart shelf can determine when it is restocked based on the gross changes in the inventory it senses. This naturally is when the system can really benefit from knowing what specifically is now on the shelf at the time of restocking since it knows a change was detected. Taking a photo after this restocking trigger is beneficial, as opposed to an arbitrarily prescribed time when a retailer doesn't know if anything changed or if the photo will be useful. For example, cameras could be programmed to take a picture at 8:00 every morning, assuming that restocking was completed by then, but in reality, the first shelf may have been stocked at 7:58, the second shelf at 8:03, the third shelf at 8:05, and so on. The images taken at 8:00 for the second shelf onward would be outdated within minutes and would sit with this information for 24 hours until the next image is taken. More intelligent choices could be made if the timing of the photo was tied to the shelf sensing output. Additional criteria for when the camera could be triggered or authorized to take another image may include: 1) when the shelves are faced (i.e. pulling the merchandise forward to the shelf's edge, a.k.a. leveled or zoned), 2) when the number of items on the shelf met a specified threshold, 3) when the change in the number of items on the shelf met a specified threshold, or 4) when a certain percentage of the shelf area is populated. When the specified conditions are not met, the camera will wait to take the next photo. As used herein in this description "met" may mean that a particular threshold value has been crossed meaning that a value has risen above the threshold value, or fallen below the threshold value. In some cases, "met" may mean that a value tracked by the system is equal to the threshold value.

As an added benefit, this arrangement can check if the actual shelf inventory is compliant with a formal planogram, and additionally, the smart shelf can also be used to automatically generate and update the formal planogram. This will allow store managers to digitally see what is actually on their shelves and where it's stocked. For example, when the retailer is out of stock on one SKU but has overstock for the SKU in the next shelf lane, store associates will likely put the overstocked item in the adjacent empty spot on the shelf. Retailers and consumer packaged goods companies prefer to have something on the shelves to sell instead of nothing, even if it's the "wrong" item per the formal planogram. With the automatic planogram updates made by the system described here however, the actual planogram would reflect reality, which is ultimately more useful. Additionally, the apparatuses, systems, and methods disclosed herein may be able to identify a plurality of different product identifiers and characteristics, such as, for example, product SKUs and product UPCs.

In addition to the planogram updates, information displayed on electronic shelf labels (ESLs) can be generated or updated in the same fashion as the planogram is. In some embodiments, the ESLs may be created and/or updated at the same time as the planogram is created and/or updated. For example, when overstocked inventory is put in the adjacent lane, and the smart shelf sensor, in conjunction with the camera, update the planogram, this could then trigger ESL data for the respective SKUs affected in the planogram to be updated as well. This includes product names, SKUs, prices, etc. listed on the ESLs.

FIG. 1 illustrates an example system 100 for object recognition and planogram generation. In some embodiments, the system 100 may include additional or fewer components than are depicted in the figure.

The example system 100 may comprise a shelf 102, a camera 104, a sensor 106, a network 108, network connections 110, and a server 112. The camera 104, sensor 106, and server 112 may be communicatively coupled to each other via the network 108 and network connections 110. As such, those components may be able to exchange information with each other relevant to object recognition and planogram generation.

The shelf 102 may be part of a larger shelving unit comprising multiple individual shelves such as shelf 102. These shelves may be used to store products of a variety of dimensions. In some embodiments, the camera 104 and the sensor 106 are physically coupled to the shelf 102. In other embodiments, the camera 104 and sensor 106 may be manufactured as part of the shelf 102 itself, and in other embodiments the camera 104 and sensor 106 may be added to the shelf 102 after the shelf itself has been manufactured.

In some embodiments, the camera 104 may comprise one individual camera. In other embodiments, the camera 104 may comprise multiple cameras able to capture images at a variety of positions and angles on the shelf 102. In some embodiments, the camera 104 may be configured to capture at least one image based on the met threshold and identify at least one product identifier based on the at least one captured image. In yet other embodiments, the camera 104 may be configured to take multiple images of the objects on the shelf 102 or of the shelf 102 itself.

In other embodiments of the system 100, there may be multiple cameras per shelf 102 with space between them in order to appropriately cover all the product facings across the complete shelf 102. The camera-to-camera pitch may be based on the viewing angle of each camera 104. Accordingly, the plurality of cameras 104 may be communicatively coupled to each other to provide a more complete picture of the status of goods on an individual shelf 102, a section of shelves in a lane, as well as the totality of shelves in an aisle, or even an entire store.

In some embodiments, the server 112 may be configured to perform the identification itself, but in other embodiments, the server 112 may identify the at least one product identifier by communicating with software, applications, and/or databases located at the server 112. The product images in the databases used for product recognition may originate from a variety of sources. For example, the images could be provided by each product's supplier, by the retailer, or by a third party. The images may be taken manually or there may be an automated setup that captures multiple images for each product and are uploaded to the database. Additionally, the image data stored in the libraries may be collected via point of sale solutions that capture images of the products, along with UPC (barcode) data and/or EPC (RFID) data. For example, an in-lane or bioptic scanner may include a camera that records an image of the product while the barcode is read. To identify the at least one product identifier, the server 112 may be further configured to identify in the at least one captured image a product sku, product UPC, or a combination thereof. Additionally, other product identifiers may be used for products and identifiable by the server 112, such as, for example, brand names for products, the product class, product dimensions, as well as colors, shapes, outlines, features, patterns, and anything else in the product's appearance that visually distinguishes it. In some embodiments, the camera 104 may be capable of performing the identification itself without communication with the server 112, such that the camera 104 may be capable of performing all the same functionality listed above with respect to the server 112 in reference to performing the identification.

The camera 104 may work in conjunction with the server 112 to identify the best types of images, and the best conditions under which to take an image. This identification process may improve over time through the use of artificial intelligence and/or machine learning techniques to train the camera 104 to take better pictures. The training of the camera 104 may also include integrating the data from sensor 106 into the library of information that the camera 104, or other program, may be trained on.

In some embodiments, the camera 104 in conjunction with the server 112 may utilize artificial intelligence and machine learning tactics to identify suitable images, and conditions best suited for taking images of the shelves and the objects on the shelves. In this way, the smart shelf, i.e. the systems, apparatuses, and methods described herein, may learn and improve over time as it is deployed based on a library of images and the corresponding sensor data. More particularly, the camera 104 may be triggered to capture an image based on a threshold being detected by the sensor 106. In this way, the system 100 may know 1) whether or not the captured image is good based on how useful it is for the object recognition engine, that may be stored on the server 112, and 2) from the sensor 106, where the associated merchandise was located on the shelf 102 when the image was captured. If it is determined that images are more useful when the merchandise is positioned in a specific location, then the system 100 could adjust the thresholds that trigger the camera 104 to capture an image, improving future performance. The adjustments of the triggers and thresholds may be managed by software located at the server 112, camera 104, and/or sensor 106.

For example, the system 100 may be counting items in a shelf's lane that turn out to be beverage cans, which are relatively short, so a suitable image could have the front can positioned closer to the camera 104. In another lane, the system 100 may be counting tall beverage bottles, and in order to get a quality image for successful object recognition, the front bottle needs to be further from the camera 104 to fit more of it in the camera's field of view. So, while the system 100 may start with pre-defined default parameters for acceptable merchandise locations on the shelf 102 relative to the camera 104, based on real-world interactions it may learn over time what works well for object recognition and what doesn't and then adjust accordingly.

In some embodiments, the server 112 may be further configured to generate a planogram for the shelf based on the at least one identified product identifier. The generation of the planogram may take into account other product information such as characteristics, or dimensions related to the product. Additionally, the server 112 may be further configured to update a planogram for the shelf based on the at least one identified product identifier. The created planogram, or updated planogram, may be transmitted to a user device (not shown) via the network 108 and server 112. At the user device, an individual working in the store where the shelf 102 is located may thus have a real-time picture of the inventory in the store. In other embodiments, the creation and updating of planograms may be handled by the camera 104 capable of the same functionality listed above for the server with respect to creating and updating planograms. Similarly, the server 112 may be configured to generate or update an electronic shelf label for the shelf 102 based on the identified product identifier.

In some embodiments, the sensor 106 may comprise one individual sensor or a sensor array. In other embodiments, the sensor 106 may comprise a variety of sensors or sensor arrays linked together. In one embodiment, the at least one sensor may be a resistive sensor, capacitive sensor, light sensor, or a combination thereof. In one embodiment, the sensor 106 may be configured to detect that at least one threshold has been met. Additionally, the sensor 106 may be further configured to trigger an image to be taken by the least one camera. As such, the sensor 106 may be further configured to transmit a message to the at least one camera comprising information about the at least one threshold that has been met.

In some embodiments, the at least one threshold may be a value representative of: objects on the at least one shelf are faced, when the number of objects on the shelf met a threshold, when a change in the number of objects on the shelf met a threshold, when a certain percentage of an area of the shelf is occupied by objects, or a combination thereof. When objects are faced, the store employees may move the objects to the front edge of the shelf 102, which is an optimal location for the objects' images to be captured by the at least one camera 104. This may also be an optimal time for the camera 104 to capture an image since the employees just spent time organizing and arranging the shelf 102 merchandise. When the number of objects on the shelf 102 meets a minimum threshold, this may indicate that the shelf 102 is full enough with objects such that having an updated image captured would be useful. When the number of objects falls below a minimum threshold, this may indicate a low inventory condition, and it may be beneficial to capture another image to identify the current objects left on the shelf 102. When the number of objects on the shelf 102 increases by a threshold quantity in a specific time period (i.e. the change in the number of objects), this may indicate a restocking event has taken place and may be the optimal time to capture an image. When the number of objects on the shelf 102 decreases by a threshold quantity in a specific time period, this may indicate other significant activity has taken place at the shelf 102, such as a high volume of shopping or even a theft event (i.e. a sweep). When the number of objects on the shelf 102 has neither increased nor decreased beyond a threshold quantity in a specific time period, this may indicate that very little to nothing has physically occurred to the objects on the shelf, so there is no need to consume time or energy to capture a new image. Also, the percentage of the shelf area occupied by objects may be used for a threshold since object count may not be sufficient; there could be a larger number of physically smaller items and/or a smaller number of physically larger items on shelf 102, so using a threshold that considers the occupied shelf space compared to the size of the shelf 102 itself may be needed. For example, a threshold could be set to only capture images when the shelf is at least 75% occupied. The above listed thresholds may be set by individuals working in the retail store where the shelf 102 is located or by individuals at a remote location, such as a corporate office.

The network 108 may be a local network that is constrained to one physical location, such as, for example, an individual store. In other embodiments, the network 108 may be the Internet, and/or a combination of a local network connected to the Internet. The other components of the system 100 may connect to the network 108 via the network connections 110. This connection may be wired, or wireless, in nature. It may also utilize NFC communications, such as, for example, Bluetooth, and other types of NFC communications.

The server 112 may be local or remote to the other components in the system 100. For example, if the server is local to the other components it may be stored in the same physical building as those components. Conversely, if the server is remote it may be stored at a different physical building from the other components of the system and communicate with them via the network 108.

Figure 2:
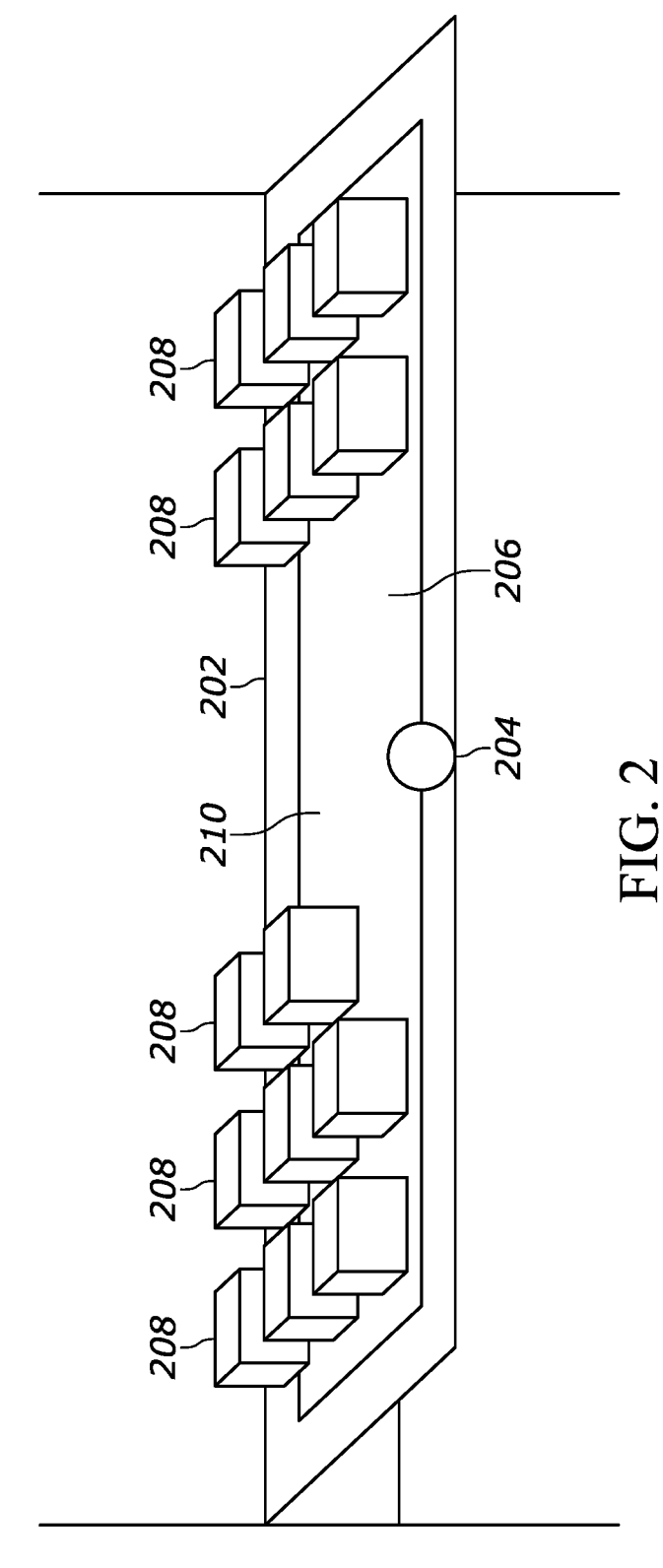
FIG. 2 illustrates an example apparatus for object recognition and planogram generation.

FIG. 2 illustrates an example apparatus 200 for object recognition and planogram generation. In some embodiments, the apparatus 200 may include additional or fewer components than are depicted in the figure.

In the embodiment shown in FIG. 2 the apparatus 200 includes a shelf 202, a camera 204, and a sensor 206. Also shown in the figure are a plurality of the same product 208, and a space 210 where product 208 could fit on the shelf 202. The apparatus 200 shown in FIG. 2 may be the same kind of apparatus shown in FIG. 1 comprising the shelf 102, camera 104, and sensor 106. Accordingly, the apparatus 200 in FIG. 2 may share the same characteristics and capabilities as the shelf 102, camera 104, and sensor 106 in FIG. 1. In other embodiments, the apparatus 200 in FIG. 2 may be configured differently from the shelf 102, camera 104, and sensor 106 of FIG. 1.

FIG. 2 depicts a plurality of products 208 that are at rest on the shelf 202. The shelf may be in a retail store, and the products 208 on the shelf are part of the inventory of that store. The camera 204 and sensor 206 may be capable of detecting changes related to the products 208 depicted in the figure. For example, the sensor 206 may detect that there is an absence of product 208 in the space 210. Depending on the sensor 206, it could, for example, detect that the level of pressure applied at the space 210 has fallen below a threshold level set by the retail store manager, and then the sensor 206 could generate and transmit a message to the camera 204. In other sensor 206 examples, the sensor 206 could detect a change in the capacitance or the light intensity at the space 210 beyond a set threshold level. Generally speaking, the camera 204 may be programmed such that it may be triggered to capture images when the sensor 206 detects object(s) on the shelf and can count them, coordinating with the camera 204 when to capture an image, which is then used to identify what those objects are.

However, in other embodiments, the camera 204 may receive the message and capture an image of the space 210, and in some cases the surrounding shelf 202 space. Based on this image the camera 204 may be able to identify the product 208 that is supposed to be in that space 210, or in other embodiments the camera 204 may be able to identify a product identifier related to the types of products 208 that should be located in space 210.

Figure 3:
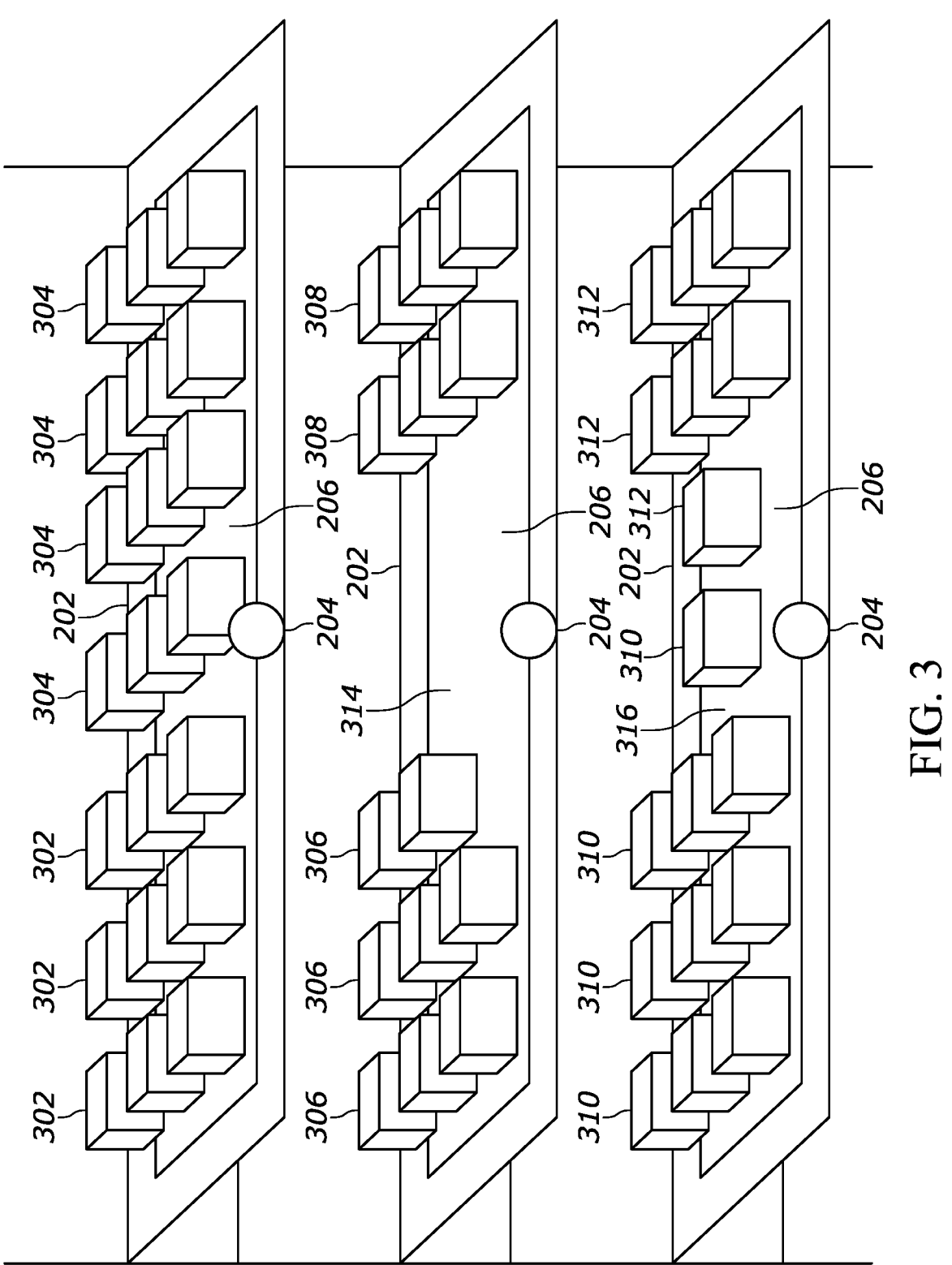
FIG. 3 illustrates example shelves comprising apparatuses for object recognition and planogram generation.

FIG. 3 illustrates example shelves 202 comprising apparatuses for object recognition and planogram generation. Each shelf 202 in FIG. 3 may include a camera 204 and sensor 206 that share the same characteristics and capabilities of the apparatus 200 depicted in FIG. 2. FIG. 3 depicts another configuration of products and shelves in, for example, a retail store.

FIG. 3 depicts a variety of different products 302, 304, 306, 308, 310, and 312. Each shelf 202 in FIG. 3 may include two different types of products as shown in the figure. The sensors 206 and cameras 204 for each shelf may be capable of detecting each product type that is located on each shelf as well as changes that are relevant to each product. For example, the sensor 206 on the top shelf 202 may detect an accurate count for products 302 and 304, but it cannot identify what products these are or distinguish one from the other. In an exemplary embodiment, the quantities detected by the sensor 206 satisfy a threshold, giving permission to the top camera 204 to capture an image or images of the objects on this shelf 202, especially the item in the center (from left-to-right) at the front edge of the shelf 202. These images are then used to identify which products are products 302 and which are products 304, and the planogram that details the specific products and their quantities is updated. In another example, the sensor 206 on the middle shelf 202 may detect an empty space at 314. This condition may meet a threshold that triggers the camera 204 to capture an image of the shelf. The sensor 206 on the bottom shelf 202 may detect the low product count in space 316, allowing the camera 204 on the bottom shelf to capture an image or images of the two product facings remaining in that space (e.g. one product 310 and one product 312). These images may then be used to confirm the products' identities. With the knowledge of what these products are and that both are low in inventory in their respective shelf locations, an employee can restock this bottom shelf 202 with the products 310 and 312. These shelves may be part of a longer shelving system that runs the length of an aisle in the store. The cameras 204 and sensors 206 may be communicatively linked to a server (not pictured) that may assist in the updating and creation of planograms based on events that are relevant to the shown products 302-312.

FIG. 4 illustrates an example flow diagram 400 for object recognition and planogram generation. One or more steps of the method 400 may be implemented as a set of instructions on a computer-readable memory and executable on one or more processors. The example flow diagram may utilize a shelf, at least one sensor, at least one camera, and at least one server.

In one embodiment, the method 400 may comprise detecting, by at least one sensor coupled to a shelf, that at least one threshold has been met (block 402); triggering, by the at least one sensor, at least one image to be captured by at least one camera coupled to the shelf (block 404); capturing, at the at least one camera, at least one image based on the met threshold (block 406); and identifying, by at least one server, at least one product identifier based on the at least one captured image (block 408).

As described herein, in some embodiments of the method 400, the at least one threshold in (block 402) may be a value representative of: when objects on the at least one shelf are faced, when the number of objects on the shelf met a threshold, when a change in the number of objects on the shelf met a threshold, when a certain percentage of an area of the shelf is occupied by objects, or a combination thereof.

In some embodiments of the method 400, triggering at least one image to be captured (block 404) further comprises transmitting, at the at least one sensor, a message to the at least one camera comprising information about the at least one threshold that has been met.

In some embodiments of the method 400, the camera capturing an image (block 406) may include the camera capturing a plurality of images. For example, the camera may capture a time series of images and select the best image representative of the objects on the shelf and/or change to the shelf. This image may ultimately be presented to a user of a user device that is attempting to access an updated, or newly created, planogram related to the shelf.

In some embodiments of the method 400, identifying the at least one product identifier (block 408) further comprises identifying, at the server, in the at least one captured image a product sku, product UPC, or a combination thereof. Additionally, other product identifiers such as those listed herein may be used and may be able to be identified by the server.

The method 400 may further comprise generating or updating, at the at least one server, a planogram for the shelf based on the at least one identified product identifier. Similarly, the method 400 may further comprise generating or updating, at the at least one server, the information displayed on at least one electronic shelf label for the shelf based on the at least one identified product identifier.

Figure 5:
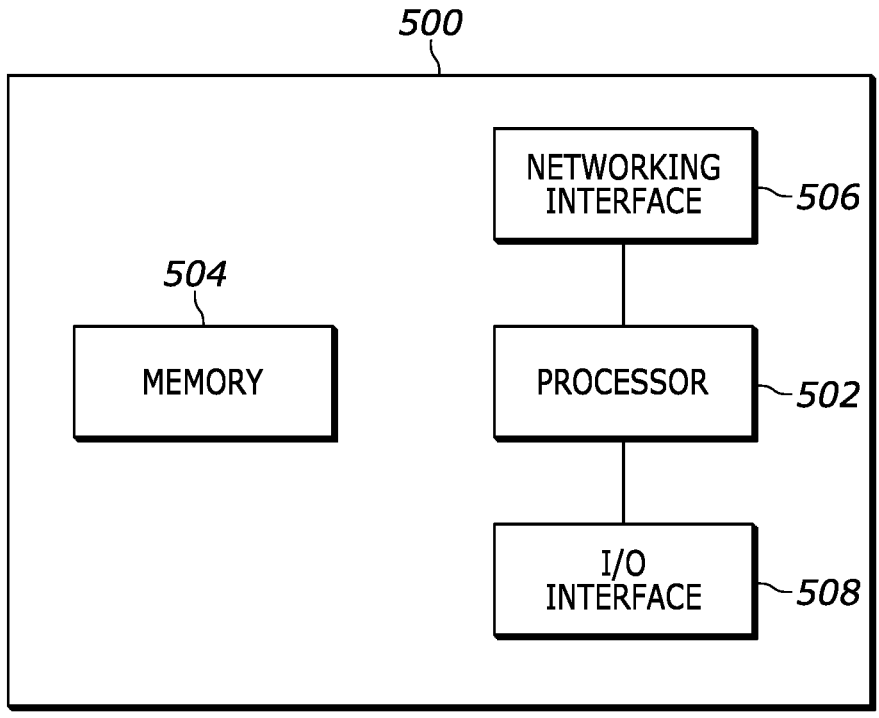
FIG. 5 is a block diagram of an example logic circuit for implementing example methods and/or operations described herein.

FIG. 5 is a block diagram representative of an example logic circuit capable of implementing, for example, one or more components of the example logic circuit of FIG. 5 or, more generally, the example processors included in the camera 104, sensor 106, and server 112 of FIG. 1, as well as the cameras 204, and sensors 206 depicted in FIGS. 2-3. The example logic circuit of FIG. 5 is a processing platform 500 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 500 of FIG. 5 includes a processor 502 such as, for example, one or more microprocessors, controllers, and/or any suitable type of processor. The example processing platform 500 of FIG. 5 includes memory (e.g., volatile memory, non-volatile memory) 504 accessible by the processor 502 (e.g., via a memory controller). The example processor 502 interacts with the memory 504 to obtain, for example, machine-readable instructions stored in the memory 504 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 500 to provide access to the machine-readable instructions stored thereon.

The example processing platform 500 of FIG. 5 also includes a network interface 506 to enable communication with other machines via, for example, one or more networks. The example network interface 506 includes any suitable type of communication interface(s) (e.g., wired and/or wireless interfaces) configured to operate in accordance with any suitable protocol(s).

The example, processing platform 500 of FIG. 5 also includes input/output (I/O) interfaces 508 to enable receipt of user input and communication of output data to the user.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A shelf, comprising:
   a surface configured to support objects;
   at least one sensor coupled to the shelf, the at least one sensor configured to detect the objects supported on the surface, and that at least one threshold has been met; and
   at least one camera coupled to the shelf, the at least one camera configured to:
   in response to a trigger by the at least one sensor, capture at least one image of the objects supported on the surface based on the met at least one threshold;
   identify at least one product identifier of at least one object based on the at least one captured image; and
   determine, based on the captured at least one image and a machine learning model, at least one condition for capturing images of at least one of the shelf and the objects supported on the surface of the shelf, wherein
   to trigger an image to be taken, the at least one sensor transmits a notification to the at least one camera, the notification comprising information about the at least one threshold that has been met, and
   the at least one threshold is when objects on the shelf are moved from a rear portion of the shelf to a front edge of the shelf for image capture by the at least one camera.

2. The apparatus of claim 1, wherein the at least one sensor is a resistive sensor, capacitive sensor, light sensor, or a combination thereof.

3. The apparatus of claim 1, wherein the at least one threshold further comprises when the number of objects on the shelf met a threshold, when a change in the number of objects on the shelf met a threshold, when a certain percentage of an area of the shelf is occupied by objects, or a combination thereof.

4. The apparatus of claim 1, wherein to identify the at least one product identifier, at least one server is configured to identify in the at least one captured image a product SKU, product UPC, or a combination thereof.

5. The apparatus of claim 1, wherein the camera is further configured to generate or update a planogram for the shelf based on the at least one identified product identifier.

6. The apparatus of claim 1, wherein the camera is further configured to communicate with at least one server to generate or update an electronic shelf label for the shelf based on the at least one identified product identifier.

7. A method, comprising:
   detecting, by at least one sensor coupled to the shelf, that at least one threshold has been met;
   triggering, by the at least one sensor, at least one image to be captured by at least one camera coupled to the shelf;
   capturing, at the least one camera coupled to the shelf, at least one image based on the met at least one threshold;

identifying, by the at least one camera, at least one product identifier based on the at least one captured image; and determining, based on the captured at least one image and a machine learning model, at least one condition for capturing images of at least one of the shelf and objects supported on a surface of the shelf, wherein triggering further comprises transmitting, at the at least one sensor, a notification to the at least one camera, the notification comprising information about the at least one threshold that has been met, and the at least one threshold is when objects on the shelf are moved from a rear portion of the shelf to a front edge of the shelf where the objects for image capture by the at least one camera.

8. The method of claim 7 wherein the at least one sensor is a resistive sensor, capacitive sensor, light sensor, or a combination thereof.

9. The method of claim 7, wherein the at least one threshold further comprises when the number of objects on the shelf met a threshold, when a change in the number of objects on the shelf met a threshold, when a certain percentage of an area of the shelf is occupied by objects, or a combination thereof.

10. The method of claim 7, wherein identifying further comprises:

identifying, by at least one server, in the at least one captured image a product SKU, product UPC, or a combination thereof.

11. The method of claim 7 further comprising:

generating or updating, by at least one server, a planogram for the shelf based on the at least one identified product identifier.

12. The method of claim 7, further comprising:

generating or updating, by at least one server, an electronic shelf label for the shelf based on the at least one identified product identifier.

13. A tangible machine-readable medium comprising instructions that, when executed, cause a machine to at least:

detect that at least one threshold has been met at a shelf of a shelving unit by at least one sensor coupled to the shelf;

trigger at least one image to be captured by at least one camera coupled to the at least one sensor and the at least one shelf;

capture at least one image of the shelf based on the met at least one threshold by at least one camera;

identify at least one product identifier based on the at least one captured image by the at least one camera; and determine, based on the captured at least one image and a machine learning model, at least one condition for capturing images of at least one of the shelf and objects supported on a surface of the shelf, wherein causing the machine to trigger the at least one image to be captured comprises transmitting a notification from the at least one sensor to the at least one camera comprising information about the at least one threshold that has been met, and the at least one threshold is when objects on the shelf are moved from a rear portion of the shelf to a front edge of the shelf for image capture by the at least one camera.

14. The tangible machine-readable medium of claim 13 wherein the at least one sensor is a resistive sensor, capacitive sensor, light sensor, or a combination thereof.

15. The tangible machine-readable medium of claim 13, wherein the at least one threshold further comprises when the number of objects on the shelf met a threshold, when a change in the number of objects on the shelf met a threshold, when a certain percentage of an area of the shelf is occupied by objects, or a combination thereof.

16. The tangible machine-readable medium of claim 13, wherein the instructions further cause the machine to at least:

identify in the at least one captured image a product SKU, product UPC, or a combination thereof at the camera.

17. The tangible machine-readable medium of claim 13, wherein the instructions further cause the machine to at least:

update a planogram, an electronic shelf label, or a combination thereof for the shelf based on the at least one identified product identifier.

* * * * *